June 29, 1965  W. L. DEFIBAUGH ETAL  3,191,505
HYDRAULIC CONTROL FOR A SLIDE UNIT
Filed Nov. 21, 1961  3 Sheets-Sheet 2
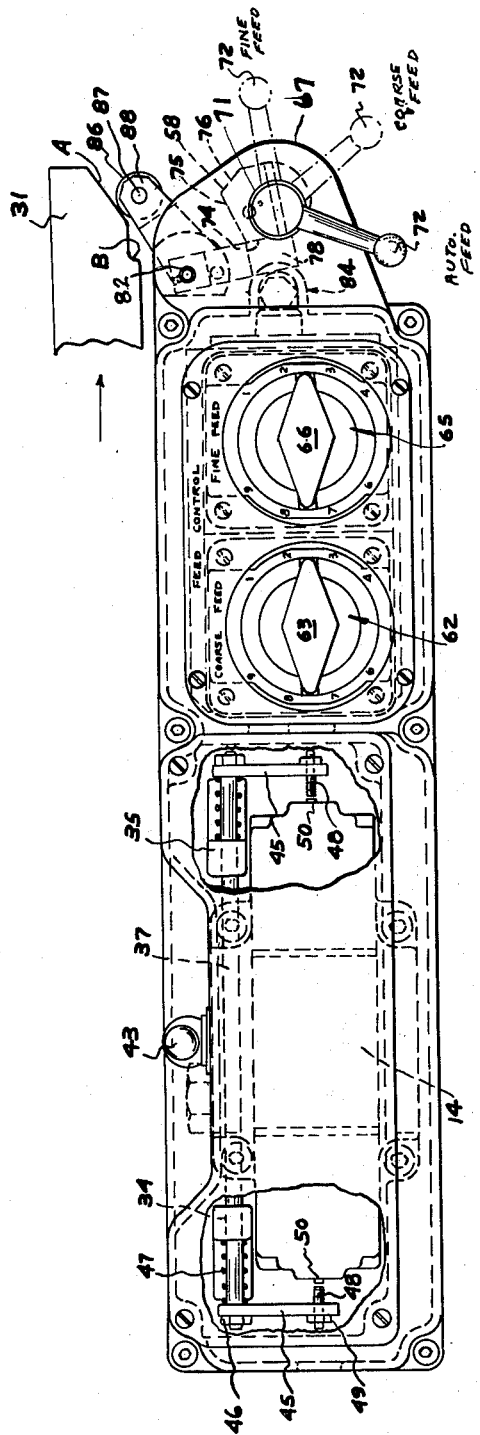
INVENTORS
ROGER S. NAEYAERT
WILLIAM L. DEFIBAUGH
BY
Robert C. Sloman
ATTORNEY

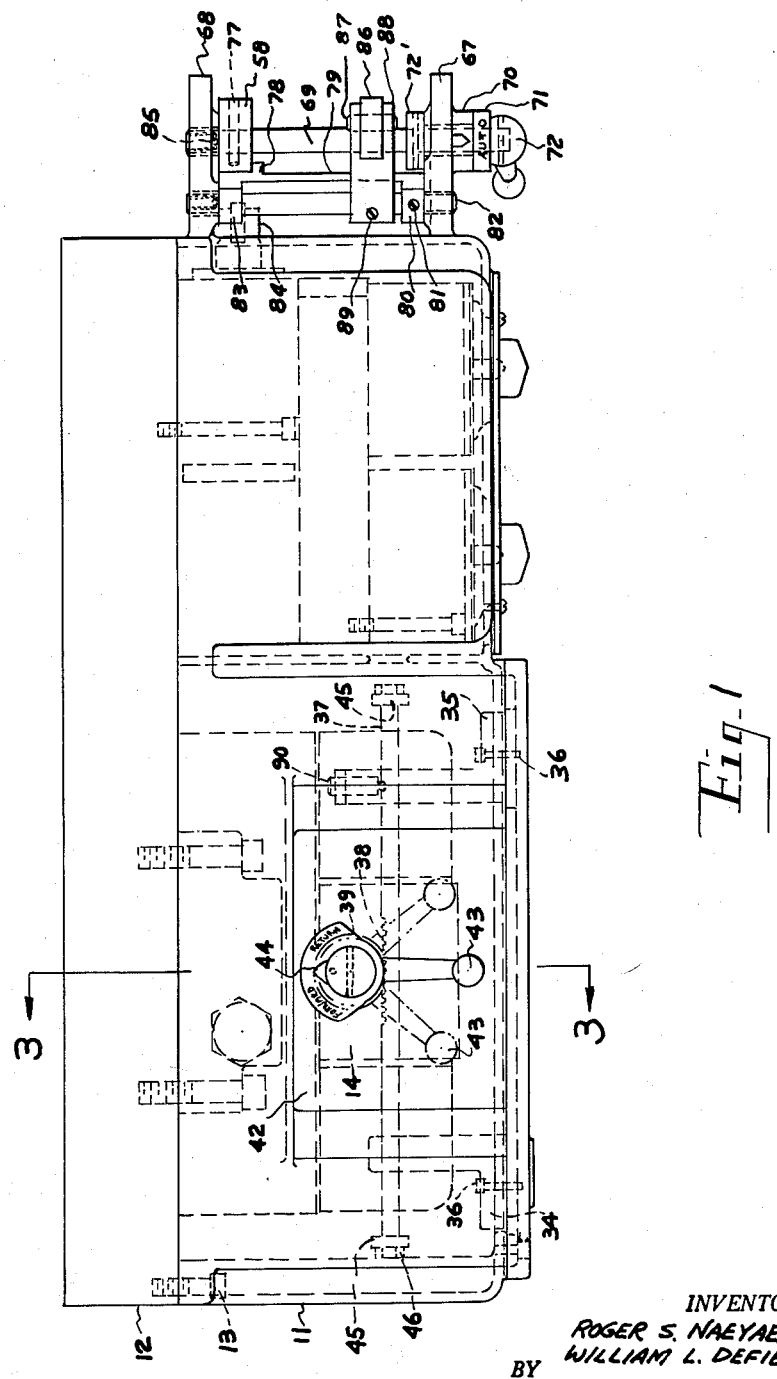

United States Patent Office 3,191,505
Patented June 29, 1965

1

3,191,505
HYDRAULIC CONTROL FOR A SLIDE UNIT
William L. Defibaugh, Warren, and Roger S. Naeyaert, Grosse Pointe Woods, Mich. (both of 3267 Wight St., Detroit, Mich.)
Filed Nov. 21, 1961, Ser. No. 155,241
8 Claims. (Cl. 91—407)

This invention relates to a hydraulic control for a slide unit such as might be used in conjunction with a machine tool, and more particularly to control means for regulating the direction of feed movement and the speed of feed movement.

It is the object of the present invention to provide a hydraulic control for a slide unit which incorporates a cylinder assembly with reciprocal piston rod for effecting movements of the slide unit, a valve mechanism connected to a source of pressure fluid for directing pressure fluid selectively to opposite ends of said cylinder, together with a manual control associated with the valve element for selectively effecting manually the desired control position of the valve element for effecting a desired direction of feed movement of said slide unit.

It is a further object of the present invention to provide in conjunction with the exhausting of fluid from the said hydraulic cylinder, a deceleration valve on either automatic or manual control by which after a predetermined distance of feed movement of the slide unit, the same may be slowed down the extent desired by restricting at that moment automatically the flow of exhaust fluid from the said cylinder.

It is a further object of the present invention to provide in conjunction with said deceleration valve a spring-biased valve element which is normally biased into a neutral position providing for an automatic feed and wherein there is no restriction of exhaust fluid returning from the cylinder to the control valve, and which valve element in said deceleration valve is movable either by a dog on the slide unit, or by a manual control into a first control position by which, after a certain amount of feed movement of the said slide unit, the exhaust flow of fluid returning from the cylinder passes through a metering valve before exhausting to the control valve, and wherein the extent of the aperture within the metering valve may be manually regulated as desired for determining a decelerated but "coarse feed."

It is a further object of the present invention to incorporate within the deceleration valve a second position of movement for said movable valve element therein by which the exhaust fluid from said cylinder is directed to a "fine feed" exhaust control metering valve, and thence through the "coarse feed" exhaust metering valve before returning to the control valve for exhausting, and wherein said movable valve element is either under the control of a dog carried by the slide unit, or under the control of a manually operative cam, mounted on the hydraulic control casing.

It is a further object of the present invention to provide a novel form of deceleration valve, together with a set of manual cam controls therefor, by which on manual adjustment of the cam mechanism of said control, the movable valve element of said deceleration valve may be either in automatic position for free unrestricted exhaust flow, or will be moved to a second position for a coarse metering of the exhaust flow or movable to a third position for a fine metering of the exhaust return fluid.

These and other objects will be seen from the following specification and claims in conjunction with the appended drawings in which:

FIG. 1 is a plan view of the present hydraulic control for a slide unit.

2

FIG. 2 is a front elevational view thereof with the actuating dog from the slide unit fragmentarily shown.

FIG. 3 is a section, fragmentarily shown, taken on line 3—3 of FIG. 1.

Figure 4:
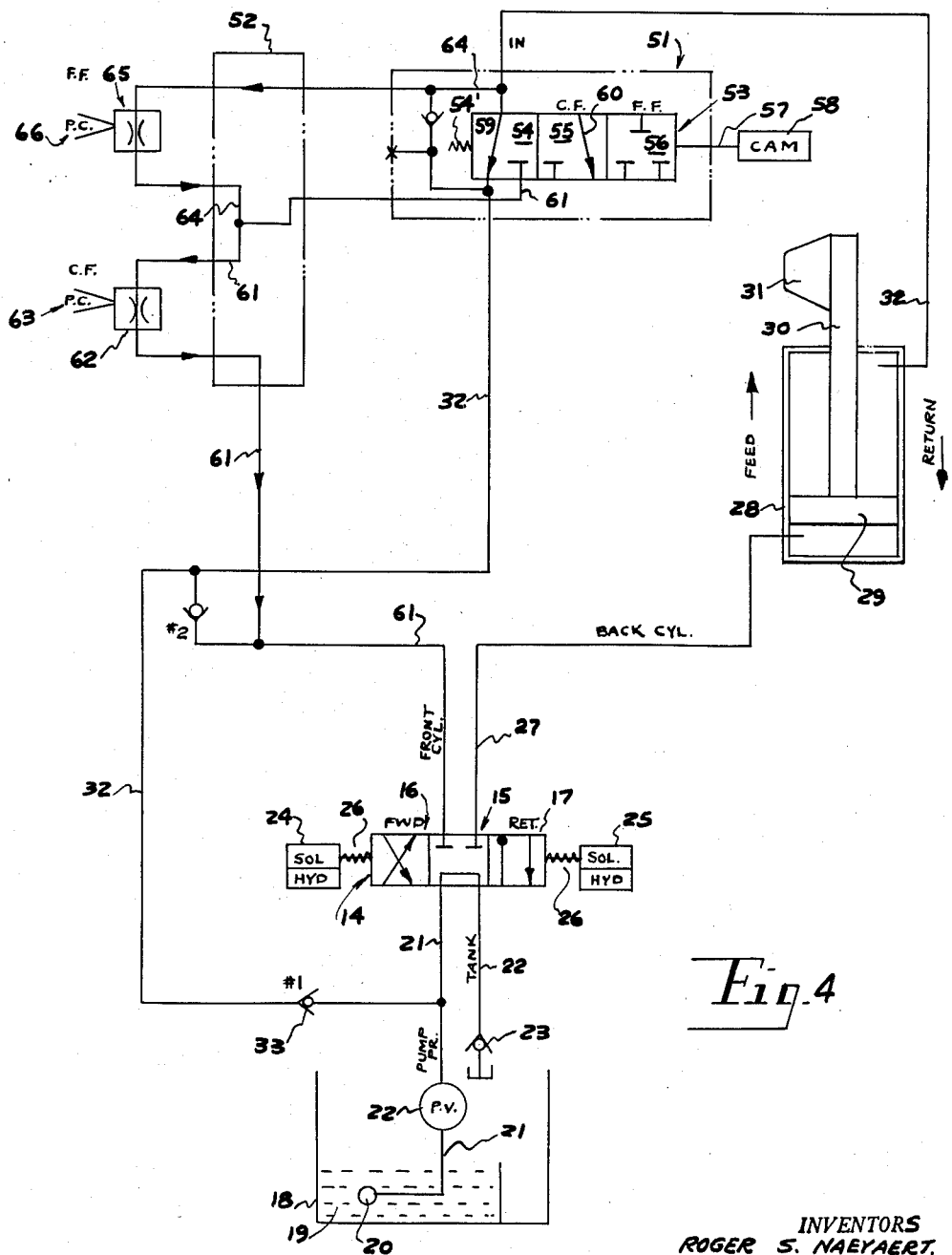
FIG. 4 is a hydraulic diagram.

It will be understood that the above drawings illustrate merely a preferred embodiment of the present hydraulic control for a slide unit and that other embodiments are contemplated within the scope of the claims hereinafter set forth.

Referring to the drawings, the present hydraulic control includes a hollow casing 11, having a fluid storage manifold 12 secured thereto for receiving an exhausting pressure fluid from a hydraulic unit, such as shown schematically at 18–19 of FIG. 4, said manifold being secured to the said casing by the fasteners 13.

Within the said casing, there is mounted and secured a suitable hydraulic control valve 14, which is schematically shown in FIG. 4 and which may be a fourway valve, for illustration, and which includes a ported reciprocal valve element 15, which has a central neutral position, such as shown in FIG. 4 and is normally spring-biased into said neutral position by the pair of oppositely arranged coil springs 26.

As schematically shown, the movable valve element has a first control position 16, which corresponds to a forward feed movement of the hydraulic cylinder assembly of FIG. 4, and a second control position 17, which corresponds to a movement of the valve element 15 by which the said control valve governs the return movement of the cylinder assembly 28–29–30.

A suitable hydraulic sump 18 is provided, stored with fluid, such as oil at 19, and which includes an inlet 20 to the power operated pump 22 for delivering pressure fluid through conduit 21 to the control valve casing 14, there being also provided an exhaust return conduit 22 from the said casing back to the check valve 23 communicating with the interior of the storage sump 18 for receiving exhaust fluid from the cylinder assembly.

It is contemplated as a part of the present invention that the movable valve element 15 of the control valve 14 may be operated by a pair of remote controlled separately operable solenoids 24 and 25, which would be connected to opposing end portions of the movable valve element 15 or axial extension thereof for moving the said valve element selectively into one or the other of the two control positions shown at 16 and 17.

The control valve body 14 has a pair of cylinder ports, one of which is connected by the conduit 27 to one end of the hydraulic cylinder 28, which contains reciprocal piston 29, piston rod 30, the said piston rod 30 at its end mounting a control dog 31 for operation of a certain deceleration valve hereafter to be described.

It is contemplated, however, that the control dog 31 may not necessarily be on the piston rod, but may be mounted upon some portion of a slide unit with the said slide unit connected to the piston rod as at 31, for illustration, being a schematic illustration.

There is a second cylinder port on the valve body 14, to which is connected the exhaust conduit 61, which is indirectly connected as hereafter described through the deceleration valve assembly 51 to the conduit 32, which connects the opposite end of the hydraulic cylinder 28.

Accordingly, in one position of the valve element 15, the pressure fluid is delivered through conduit 27 to the one end of cylinder 28 for effecting a feed movement of the piston and piston rod and the connected slide unit, schematically indicated at 31. At the same time, the exhaust fluid from the opposite end of the cylinder returns through exhaust conduit 32 back to the deceleration valve 51, and depending upon the positioning of the movable valve element within the deceleration valve, returns through various conduits back to the hydraulic sump 18, as hereinafter described, such as through the conduit 32, check valve 33, which joins the conduit 21.

*Manual control for hydraulic control valve*

Referring to FIGS. 1, 2 and 3, within the casing 11, as shown in FIG. 1, there are mounted a pair of longitudinally spaced inward directed brackets 34 and 35 secured within the casing at 36, and being transversely apertured to slidably support and receive the longitudinally reciprocal shaft 37, which intermediate its ends is formed with rack gear 38.

As shown in FIGS. 1 and 3, the pinion 39, upon the interior of casing 11, is secured to the stud shaft 40 and engages the boss 41 upon the interior of the said casing corresponding to the cover 42 therefor and is in mesh with the rack 38. The manual control lever 43 upon the exterior of the casing cover at one end is secured to the stud shaft 40 for effecting rotary movements of stud shaft 40 and corresponding movements of pinion 39 in turn controlling reciprocal movements of the shaft 37.

As shown in FIG. 1, upon the cover 42, and adjacent the lever 43, and movably secured thereto is the pointer 44, which is adapted to register either in the upright neutral position shown, or register with one or the other of the two indicated positions "forward" or "return," which correspond to the respective feed movements of the hydraulic cylinder assembly above mentioned.

The opposite ends of the control shaft 37 are operatively connected to opposite end portions of the movable valve element 15 within the control valve by means of a pair of plates 45, secured as at 46 to the outer ends of the said shaft 37 and which extend at right angles thereto for registry with the opposite ends of the said control valve element.

The inner ends of the plates 45, as best shown in FIG. 2, have adjustably secured thereto as at 49, the axially directed screws or studs 48 which are in longitudinal alignment with the respective end portions 50 or extensions of the movable valve element 15 and arranged closely adjacent thereto. Accordingly, it is seen that on manual control movements of the lever 43 there will be effected a longitudinal movement in one direction or the other of shaft 37, and a corresponding control movement of a movable valve element 15 within the control valve 14.

For example, if the lever is so tilted in a counterclockwise direction that the pointer 44 registers with the indicia "forward" of the cover 42, then the valve element will be so moved that pressure fluid through the conduit 21 passes through the position 16 of a ported valve element 15 and through the conduit 27 to the hydraulic cylinder 28 for effecting a longitudinal feed movement of the piston rod 30 and connected slide unit, which is schematically indicated at 31. Accordingly, the feed movement can be stopped at any time by manually returning the lever 43 to the upright neutral position shown in FIG. 1. Alternately, if at any time, it is desired to reverse the movement of the cylinder assembly, all that is necessary is for the operator to move the manual control lever 43 in a clockwise direction so that the pointer 44 registers with the indicia "return," shown on cover plate 42.

This moves the movable valve element 15 of the control valve 14, FIG. 4, to the return position, indicated at 17, reversing the fluid connections from the cylinder ports of the valve body 14 so that pressure fluid is delivered through conduit 61 and through conduit 32 to the opposite end of the hydraulic cylinder 28, with exhaust from said cylinder returning through conduit 27 back to the other port of the valve body and eventually to the tank or storage unit through the exhaust conduit 22.

Referring to FIG. 2, the coiled springs 47 surround outer end portions of control shaft 37 and are interposed in compression between the respective brackets 34 and 35 and the control plates 45. Accordingly, the shaft 37 is normally biased into a central or neutral position with a corresponding central or neutral position of the movable valve element 15, shown in FIG. 4.

*Deceleration valve exhaust fluid control*

As a part of the present invention, it is contemplated in the movement of machine tools, and particularly the present slide unit, which for example, may carry a machine tool or cutting tool, for a substantial portion of the inward feed of the said tool, feed movement of the hydraulic cylinder, piston rod 30 may be reasonably constant, however, towards the end of the feed movement at a predetermined point of movement of the slide unit it is desirable that the feed be slowed down, as where the cutting tool engages the workpiece, for illustration, such as in a drilling operation.

The present invention contemplates a construction of a deceleration valve which is either dog operated on movement of the slide movement, or manually operated by a control cam by which the exhaust fluid returning from the hydraulic cylinder 28 may be either unrestricted on its return flow to the hydraulic unit, or may be partly restricted corresponding to a "coarse feed" or additionally restricted corresponding to a "fine feed."

For this purpose, there is shown in FIG. 4, schematically a deceleration valve 51 and associated metering valve assembly 52 with the said deceleration valve including the ported movable valve element 53, normally spring-biased at 54' within the deceleration valve casing 51 to "automatic" position 54, designated in FIG. 4, by which, when in this position, the exhaust fluid from the feed cylinder 28 returning through conduit 32 passes directly through the deceleration valve, through the port 59, conduit 32, back to the hydraulic unit.

Alternately, when valve element 53 is in intermediate position 54, the exhaust fluid will flow through conduit 32, port 60, and through branch 61 to metering valve 52–62 and back to the control valve 14, and thence through conduit 22, back to the hydraulic unit.

In any event, the deceleration valve 51 has an automatic control position by which the return of exhaust fluid is unrestricted, and does not pass through the metering valve assembly 52, but on the other hand returns directly to the hydraulic unit. Under these conditions, the feed movement of the piston 30 and associated slide unit 31 is unrestricted.

Movable valve element 53 in the deceleration valve has a second control position 55, wherein the exhaust fluid through the conduit 32 passes through the port 60 and through conduit 61 to the manual control "coarse feed" metering valve 62, thence through conduit 61 back to the port of the valve body 14, and through exhaust conduit 22 back to the hydraulic tank 18.

As shown in FIG. 2 for the said "coarse feed" metering valve, there is a manual control element 63 thereon, corresponding to the front face of the metering valve assembly, which can be rotated for further restricting or regulating the orifice in the metering valve 62 for a finer adjustment or regulation of the exhaust flow of fluid therethrough.

The movable valve element 53 of the said deceleration valve has a third control position 56, wherein it is seen that the porting is blocked off in such a manner that the exhaust fluid passing through conduit 32 from the cylinder goes via conduit 64 to the "fine feed" exhaust metering valve 65 and thence through conduit 64, joining conduit 61, and through the "coarse feed" metering valve 62 and conduit 61, back to the hydraulic unit.

Accordingly, when the movable valve element of the deceleration valve has been moved to its third position, then in that case, all exhaust fluid must pass through both the said metering valves 62 and 65, with the result that there is a "fine feed" developed with respect to longitudinal movements of the slide unit under the control of the said deceleration valve.

Here also the "fine feed" metering valve 65 has a manual control element 66 on the front face thereof, as shown in FIG. 2, by which the extent of the aperture in the said metering valve 65 may be regulated as desired for a further fine controlling of the said metering valve.

The said movable valve element 53, forming a part of the deceleration valve 51, may be automatically operated by virtue of the dog 31, which is shown in FIG. 2, and which is connected to or forms a part of the slide unit and is intended to schematically represent a portion of the slide unit. Upon a predetermined longitudinal feed movement of the slide unit 31 and associated dog, the control surface A engages the roller 86 on shaft 87 on the roller block 88, which is secured at 89, FIG. 1, to the shaft 82.

This shaft, as hereafter described, mounts a cam plate 79, whose bifurcated apertured end portions 80 and 83 are mounted over the said shaft 82 and secured thereto at 81. The said cam plate 79 has control portion 78, which operatively engages the axially projecting end portion of the movable valve element 53 within the deceleration valve 51, as shown at 84 in FIG. 1. Furthermore, the said control portion 78 of the cam plate 79 would correspond to the schematic positioning of the cam 58 shown in FIG. 4, the purpose being that the control surface A on the slide unit 31 operatively engages the roller 86 to cause a rotary clockwise tipping movement of the roller block 88 and a corresponding rotary movement of the said shaft 82. This shaft causes the cam plate 79-78 to move in a clockwise direction for operative engagement with the movable valve element 53 of the deceleration valve for moving the said valve element from its spring-biased "automatic" neutral position to a second control position, corresponding to position 55, FIG. 4.

Arranged upon one end of the casing 11 are a pair of parallel spaced brackets 67 and 68. Journaled between the said brackets is a manually rotative shaft 69, which extends through the hub 70, through the dial supporting element 71, and carries at its outer end the manual control lever 72 for effecting rotary movement of shaft 69.

Upon the dial 71, and spaced thereon, are the three indicia which read "auto," meaning automatic control; the second indicium reading "coarse feed" and a third indicium reading "fine feed," which indicia correspond to rotary movements of the control lever 72, and are schematically indicated in FIG. 2. The solid line positioning of the said control lever corresponding to the "automatic" position and in turn corresponding to the automatic position 54 of the movable valve element 53 of deceleration valve 51, is shown in FIG. 4.

A cam 58 is mounted on the shaft 69 and secured thereto by the set screw 77 and includes a series of control surfaces 74, 75 and 76, shown in FIG. 2, which correspond respectively to the following control positions "automatic," "coarse feed," or "fine feed." Each of the respective cam surfaces are adapted for cooperative engagement with the depending lower end portion 78 of the cam plate 79, wherein it is seen that the said cam plate at its control portion 78 operatively engages the projecting end of the movable valve element, as indicated at 84.

In the schematic illustration, shown in FIG. 4, the movable valve element 53 of the deceleration valve has an axial stem 57 projecting therefrom, whose end portion would correspond to the element 84, shown in FIG. 1, adapted for registry with the cam plate 79-78, under the control of cam 58.

In any event, it is seen that the cam plate 78-79 is mounted upon the rotative shaft 82 and secured thereto. Accordingly, any rotation of the shaft 82 will effect axial adjustment of the movable valve element 53 of the deceleration valve. For example, the slide unit dog 31 at its control surface A, may engage the roller 86 and through the roller block 88, cause a rotary movement of the shaft 82 for operating the deceleration valve in an automatic manner.

Furthermore the manual control arm 72 on the casing 11, at one end thereof, is rotated into one of three control positions, and by rotation of the respective cam surfaces, 74, 75 and 76, operatively engages the cam plate 78 and 79, which in turn activates the movable valve element 53 of the deceleration valve.

As shown in FIG. 1, there is a retaining collar 72' mounted upon the shaft 69 upon the interior surface portion of the bracket 67, which collar is suitably pinned to shaft 69 for retaining the same against relative longitudinal movement.

As shown in FIG. 1, there is a spring-biased ball detent 85, engageable with spaced indentations formed in the cam 58 upon one side thereof for registry therewith in any one of the three above described control positions.

There is also shown at 90, FIG. 1, another spring-biased ball detent, which is registerable with one or more indentations in the control shaft 37 corresponding to the two control positions of "forward" or "return," corresponding to feed movements of the cylinder assembly 28.

In connection with the operation of the deceleration valve, the rotative shaft 82 has mounted thereon for rotation therewith, the cam plate 78-79, whose control surface 78 is adapted for operative engagement, as at 84, FIG. 1, with the movable valve element 53 of the said deceleration valve. The shaft 82 may be rotated in one of two manners. It may be rotated automatically by the dog 31 and the control surface A or B, acting upon the roller 86, and the roller block 88, which is secured at 89 to the said shaft 82.

This will cause a control movement of the movable valve element. On the other hand, the manual control arm 72 may effect rotation of the control cam 58, so that any one of its three control surfaces 74, 75 and 76 will operatively register with the control portion 78 of the cam plate 79, in turn effecting operative adjustment of the movable valve element 53 of the deceleration valve.

It is contemplated as a part of the present invention that the dog 31 which forms a part of the slide unit may have a second control surface B, which after a predetermined distance of feed movement of the said slide unit will operatively engage the roller 86 for a further rotary movement for moving the movable valve element 53 into its third or "fine feed" control position 56 for full metering, through both metering valves 62 and 65 of exhaust fluid.

Having described our invention, reference should now be had to the following claims.

We claim:

1. In a hydraulic control for a slide unit, a feed cylinder including a reciprocal piston rod operatively connected to said slide unit, a casing, a control valve in said casing adapted for connection to a source of pressure fluid and including a pair of cylinder ports, delivery and exhaust conduits respectively connecting said ports with opposite ends of said cylinder for selectively delivering pressure fluid to one end thereof for effecting a feed movement of said piston rod and connected slide unit and for receiving exhaust fluid from its opposite end, a deceleration valve body in said exhaust conduit, a ported movable valve element in said valve body normally spring-biased into a neutral position for directing exhaust fluid without restriction for exhausting, and movable into a second position for restricting said flow of exhaust fluid, a pair of brackets on said casing, a rotatable shaft journaled on said brackets, a cam plate secured to said shaft and extending radially therefrom and operatively engageable with the movable valve element of said deceleration valve, a second rotative shaft on said brackets parallel to and spaced from said first shaft, a cam on said second shaft operatively engageable with said cam plate, and a manual control lever secured on one end of said second shaft for selectively rotating the same and its connected cam for moving said valve element from its neutral position to said second exhaust restricting position for slowing down the feed movement of said slide unit, and a coarse feed exhaust fluid metering valve connected into said exhaust conduit, said valve element when moved into said second position directing said exhaust fluid through said coarse feed metering valve.

2. In a hydraulic control for a slide unit, a feed cylinder including a reciprocal piston rod operatively connected to said slide unit, a casing, a control valve in said casing adapted for connection to a source of pressure fluid and including a pair of cylinder ports, delivery and exhaust conduits respectively connecting said ports with opposite ends of said cylinder for selectively delivering pressure fluid to one end thereof for effecting a feed movement of said piston rod and connected slide unit and for receiving exhaust fluid from its opposite end, a deceleration valve body in said exhaust conduit, a ported movable valve element in said valve body normally spring-biased into a neutral position for directing exhaust fluid without restriction for exhausting, and movable into a second position for restricting said flow of exhaust fluid, a pair of brackets on said casing, a rotatable shaft journaled on said brackets, a cam plate secured to said shaft and extending radially therefrom and operatively engageable with the movable valve element of said deceleration valve, a second rotative shaft on said brackets parallel to and spaced from said first shaft, a cam on said second shaft operatively engageable with said cam plate, a manual control lever secured on one end of said second shaft for selectively rotating the same and its connected cam for moving said valve element from its neutral position to said second exhaust restricting position for slowing down the feed movement of said slide unit, a coarse feed exhaust fluid metering valve connected into said exhaust conduit, said valve element when moved into said second position directing said exhaust fluid through said coarse feed metering valve, and a fine feed exhaust fluid metering valve connected into said exhaust conduit for delivering exhaust to said coarse feed metering valve, said movable valve element operably engageable by said cam plate for movement into a third position for directing said exhaust fluid to and through said fine feed exhaust metering valve.

3. In the hydraulic control of claim 2, a dial on one of said brackets with spaced indicia indicating "automatic feed," "coarse feed," and "fine feed," said cam having a series of control surfaces at different center distances corresponding to said "automatic, coarse and fine feeds," said control lever selectively movable manually into one of said control positions.

4. In a hydraulic control for a slide unit, a feed cylinder including a reciprocal piston rod operatively connected to said slide unit, a casing, a control valve in said casing adapted for connection to a source of pressure fluid and including a pair of cylinder ports, delivery and exhaust conduits respectively connecting said ports with opposite ends of said cylinder for selectively delivering pressure fluid to one end thereof for effecting a feed movement of said piston rod and connected slide unit and for receiving exhaust fluid from its opposite end, a deceleration valve body in said exhaust conduit, a ported movable valve element in said valve body normally spring-biased into a neutral position for directing exhaust fluid without restriction for exhausting, an exhaust fluid coarse feed metering valve connected into said exhaust conduit, said deceleration valve element being movable into a second position delivering exhaust fluid to and through said metering valve for restricting said flow of exhaust fluid, a pair of brackets on said casing, a rotatable shaft journaled on said brackets, a cam secured to said shaft and extending radially therefrom and operatively engageable with the movable valve element of said deceleration valve, and a manual control lever secured on one end of said shaft for selectively rotating the same and its connected cam for moving said valve element from its neutral position to said second exhaust restricting position for slowing down the feed movement of said slide unit.

5. In the hydraulic control of claim 4, a fine feed exhaust fluid metering valve connected into said exhaust conduit for delivering exhaust to said coarse feed metering valve, said movable valve element operably engageable by said cam for movement into a third position for directing said exhaust fluid to said fine feed exhaust metering valve.

6. In the hydraulic control of claim 4, a fine feed exhaust fluid metering valve connected into said exhaust conduit for delivering exhaust to said coarse feed metering valve, said movable valve element operably engageable by said cam for movement into a third position for directing said exhaust fluid to said fine feed exhaust metering valve, and a dial on one of said brackets with spaced indicia indicating "automatic feed," "coarse feed," and "fine feed," said cam having a series of control surfaces at different center distances corresponding to said automatic, coarse and fine feeds, said control lever selectively movable into one of said control positions.

7. In a hydraulic control for a slide unit, a feed cylinder including a reciprocal piston rod operatively connected to said slide unit, a casing, a control valve in said casing adapted for connection to a source of pressure fluid and including a pair of cylinder ports, delivery and exhaust conduits respectively connecting said ports with opposite ends of said cylinder, for selectively delivering pressure fluid to one end thereof for effecting a feed movement of said piston rod and connected slide unit and for receiving exhaust fluid from its opposite end, a deceleration valve body in the casing connected into the exhaust conduit, a ported movable valve element in said valve body normally spring biased into a neutral position for directing exhaust fluid without restriction for exhausting, a coarse feed exhaust fluid metering valve connected to said exhaust conduit, said deceleration valve element being movable into a second position against said spring bias for directing said exhaust fluid to and through said coarse feed metering valve, a dog on said slide unit adapted on a determined length of feed movement for operative engagement with said valve element for moving the same into its second position, for slowing down the completion of the feed movement of said slide unit, and a fine feed exhaust fluid metering valve connected into said exhaust conduit to deliver exhaust fluid from said deceleration valve body to said course feed metering valve, said movable valve element operably engaged by said dog at a different determined length of feed movement for movement into a third position against said spring bias for directing said exhaust fluid to said fine feed metering valve, a connection between said dog and said valve element including a pair of brackets on said casing, a rotatable shaft journalled on said brackets, a cam plate secured to said shaft and extending radially therefrom and operatively engageable with the movable valve element of said deceleration valve, and a roller block having one end secured to said shaft and extending radially therefrom, and its other end operatively engaged by said dog for rotating said shaft on predetermined movements of said dog.

8. In a hydraulic control for a slide unit, a feed cylinder including a reciprocal piston rod operatively connected to said slide unit, a casing, a control valve in said casing adapted for connection to a source of pressure fluid and including a pair of cylinder ports, delivery and exhaust conduits respectively connecting said ports with opposite ends of said cylinder for selectively delivering pressure fluid to one end thereof for effecting a feed movement of said piston rod and connected slide unit and for receiving exhaust fluid from its opposite end, a deceleration valve body in said casing, a ported movable valve element in said valve body normally spring-biased into a neutral position for directing exhaust fluid without restriction for exhausting, an exhaust fluid metering valve connected into said exhaust conduit, said deceleration valve element being movable into a second position for directing said exhaust fluid to and through said metering valve restricting its flow, a pair of brackets on said casing, a rotatable shaft journaled on said brackets, a cam plate secured to said shaft and extending radially therefrom and operatively engageable with the movable valve element of said deceleration valve, a second rotative shaft on said brackets parallel to and spaced from said first shaft, a cam on said second shaft operatively engageable with said cam plate, and a manual control lever secured on one end of said second shaft for selectively rotating the same and its connected cam for moving said valve element from its neutral position to said second exhaust restricting position for slowing down the feed movement of said slide unit.

References Cited by the Examiner

UNITED STATES PATENTS

| | | | |
|---|---|---|---|
| 967,245 | 8/10 | Rowntree | 91—407 |
| 1,211,040 | 1/17 | Baird et al. | 137—625.69 |
| 2,209,418 | 7/40 | Overbeke | 137—625.69 |
| 2,251,961 | 8/41 | Snader | 121—45 X |
| 2,259,636 | 10/41 | Harrington | 121—45 |
| 2,274,603 | 2/42 | Herman et al. | 121—45 X |
| 2,299,851 | 10/42 | Schafer et al. | 121—45 |
| 2,351,263 | 6/44 | Harrington et al. | 121—45 |
| 2,486,988 | 11/49 | Schafer et al. | 121—45 X |
| 2,867,192 | 1/59 | Ettinger et al. | 91—407 |

FRED E. ENGELTHALER, *Primary Examiner.*

KARL J. ALBRECHT, SAMUEL LEVINE, *Examiners.*